(12) United States Patent
Dalton et al.

(10) Patent No.: US 11,551,418 B2
(45) Date of Patent: *Jan. 10, 2023

(54) IMAGE RENDERING OF LASER SCAN DATA

(71) Applicant: Aveva Solutions Limited, Cambridge (GB)

(72) Inventors: Graham Dalton, Manchester (GB); David Hines, Manchester (GB); Aaron Freedman, Hobe Sound, FL (US); Paul Elton, Cambridge (GB)

(73) Assignee: AVEVA SOLUTIONS LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/136,876

(22) Filed: Dec. 29, 2020

(65) Prior Publication Data

US 2021/0209848 A1 Jul. 8, 2021

Related U.S. Application Data

(63) Continuation of application No. 15/513,409, filed as application No. PCT/GB2015/051233 on Apr. 28, 2015, now Pat. No. 10,878,624.

(30) Foreign Application Priority Data

Oct. 10, 2014 (GB) ..................................... 1417978

(51) Int. Cl.
*G06T 17/20* (2006.01)
*G06T 15/04* (2011.01)
(Continued)

(52) U.S. Cl.
CPC .............. *G06T 17/20* (2013.01); *G01S 17/89* (2013.01); *G06T 7/521* (2017.01); *G06T 15/04* (2013.01);
(Continued)

(58) Field of Classification Search
CPC ......... G06T 17/20; G06T 7/521; G06T 15/40; G06T 17/10; G06T 15/04; G06T 15/80;
(Continued)

(56) References Cited

U.S. PATENT DOCUMENTS

| | | | |
|---|---|---|---|
| 2004/0170316 A1* | 9/2004 | Saquib | H04N 1/4072 382/162 |
| 2004/0222988 A1* | 11/2004 | Donnelly | A63F 13/10 345/419 |
| 2005/0128196 A1* | 6/2005 | Popescu | G01S 17/48 345/420 |

(Continued)

OTHER PUBLICATIONS

Yao, Xiaohui, et al. "A new environment mapping method using equirectangular panorama from unordered images." 2011 International Conference on Optical Instruments and Technology: Optoelectronic Measurement Technology and Systems. vol. 8201. International Society for Optics and Photonics, 2011. (Year: 2011).*
Popescu, Voicu, et al. "The modelcamera." Graphical Models 68.5-6 (2006): 385-401. (Year: 2006).*
DiVerdi, Stephen, Jason Wither, and Tobias Hollerer. "Envisor: Online environment map construction for mixed reality." 2008 IEEE Virtual Reality Conference. IEEE, 2008. (Year: 2008).*

*Primary Examiner* — Daniel F Hajnik
(74) *Attorney, Agent, or Firm* — Brown Rudnick LLP; Ian G. DiBernardo

(57) ABSTRACT

A method of rendering an image of three-dimensional laser scan data is described. The method includes providing a range cube map and a corresponding image cube map generating a tessellation pattern using the range cube map and rendering an image based on the tessellation pattern by sampling the image cube map.

16 Claims, 21 Drawing Sheets

(51) Int. Cl.
    *G01S 17/89*     (2020.01)
    *G06T 7/521*     (2017.01)
    *G06T 15/40*     (2011.01)
    *G06T 17/10*     (2006.01)
    *G06T 15/80*     (2011.01)

(52) U.S. Cl.
    CPC .............. G06T 15/40 (2013.01); G06T 17/10 (2013.01); G06T 15/80 (2013.01); *G06T 2207/10028* (2013.01); *G06T 2215/12* (2013.01); *G06T 2215/16* (2013.01)

(58) Field of Classification Search
    CPC ....... G06T 2207/10028; G06T 2215/12; G06T 2215/16; G06T 19/003; G01S 17/89
    See application file for complete search history.

(56) References Cited

U.S. PATENT DOCUMENTS

| | | | | |
|---|---|---|---|---|
| 2013/0120380 A1* | 5/2013 | Kallio | ................... | G06T 15/005 345/421 |
| 2013/0249901 A1* | 9/2013 | Sweet | ..................... | G06T 17/00 345/419 |
| 2013/0271461 A1* | 10/2013 | Baker | ..................... | G06T 15/50 345/420 |
| 2014/0049537 A1* | 2/2014 | Sahoo | ................... | G09G 5/026 345/419 |
| 2014/0087867 A1* | 3/2014 | Hightower | .......... | G07F 17/3248 463/31 |

* cited by examiner

IMAGE RENDERING OF LASER SCAN DATA

FIELD OF THE INVENTION

The present invention relates to a method of, and a system for, rendering an image of laser scan data.

BACKGROUND

A three-dimensional laser scanner can be used to survey an environment such as a process plant, vessel or other facility. A typical scanner includes a laser rangefinder which can measure a distance between the scanner and a point on a surface which is in view. By sweeping through a field of view (typically 360 degrees horizontally and nearly 180 vertically), the scanner can capture a set of ranges (herein referred to as "laser scan data") for the surrounding environment. These can be used to generate a set of points in three-dimensional space, often referred to as a "point cloud". An example of a point cloud is described in EP 1 176 393 A2.

Multiple scans can be performed at different positions in an environment and point clouds from different scans can be combined to produce a combined (or "aggregated") point cloud covering a wider area. An example of combining point cloud data can be found in WO 2004/003844 Ai.

In addition to acquiring range data, the scanner can also capture images of the surrounding environment by measuring intensity of reflected laser light or using a camera.

The point cloud(s) and images can be used to visualize and/or analyze an environment using a point cloud viewer application or a three-dimensional computer-aided design (CAD) application. Typically, these applications fall into two categories, namely those that work with points from individual scans and those that work with points combined from multiple scans.

One of the simplest applications of laser scanning is to display an image captured by an individual scan. Because the image from a laser scan is spherical, covering the area around the laser scanner, the software application can map the image onto the inside of a sphere. The application can display a portion of the sphere on a computer screen.

The user can rotate the view in order to view different portions of the entire image. This presentation is called a "bubble view".

In bubble view, the user can select a spot on the image and retrieve the three-dimensional coordinate of that location using the point cloud data for that laser scan. By selecting two points, the user can measure distances.

One type of application can overlay a three-dimensional CAD model in a bubble view. Because the application knows the three-dimensional location of the points in bubble view, it can obscure the appropriate portions of the CAD model behind the bubble view. This combined image can be useful when designing new areas of the facility.

An appealing feature of a bubble view is that it looks realistic. Realism comes from the image captured at the scanner location. A limitation of bubble views is, however, that they can only be produced for the locations at which a laser scanner was positioned. A user can select a bubble view and rotate to the left and right or up and down, but he/she cannot move forward, backward, horizontally or vertically in order to view the environment from a different perspective.

To allow free roaming, some software applications work with a combined point cloud from multiple scans. Using such an application, a user chooses a location within a facility and a viewing direction. The application then displays each point in the combined point cloud around that location from the point of view of the user. The user can move the viewing location and direction to see the points from different perspectives.

Some applications can display a CAD model in the same three-dimensional space as the combined point cloud. A user can then measure distances between locations in the CAD model and points in the point cloud. The user can also determine if portions of the point cloud intersect portions of the CAD model.

Although displaying a combined point cloud allows the user to view points from more than one perspective, this approach can have one or more drawbacks.

Displaying individual points tends to be computationally expensive. Gaps can appear in a representation of a scanned surface at close distances and so it can become difficult to discern the surfaces.

SUMMARY

According to a first aspect of the present invention there is provided a method of rendering an image of three-dimensional laser scan data. The method comprises providing a range cube map and a corresponding image cube map, generating a tessellation pattern using the range cube map and rendering an image based on the tessellation pattern by sampling the image cube map.

According to a second aspect of the present invention there is provided a method of processing three-dimensional laser scan data. The method comprises preparing a range cube map and a corresponding image cube map for use in rendering from the three-dimensional laser scan data.

By preserving laser scan data for a given scan as a set of points (as opposed to aggregating laser scan data for multiple scans) and by taking advantage of the fact that the laser scan data can be provided in the form of a displacement map which can be handled directly by a graphics system, an image of the laser scan data can be rendered efficiently and/or quickly. This can be particularly helpful when combining images from multiple scans since each scan can be processed independently and the images from different scans can be easily combined in a common buffer. This allows efficient/fast rendering not only of static images, but also moving images, for example, as a user "walks through" the environment.

Furthermore, an image can be rendered more efficiently and/or quickly by converting each set of scan data into a cube map by, if not already in the form of a panoramic spherical texture, converting the scan data into a panoramic spherical texture and then mapping the panoramic spherical texture onto a cube.

The image cube map may comprise an intensity texture for rendering a monochrome image of a scan or a colour texture (which may be captured using a camera) for rendering a colour image of a scan.

The method may comprise a pre-rendering process comprising preparing the range cube map and the corresponding image cube map, which may be carried out once, and a subsequent rendering process. Pre-rendering is preferably carried out using one or more graphics processing units (GPUs). Rendering is preferably carried out using one or more GPUs. The same GPU or GPUs can be used for pre-rendering and rendering.

The method may comprise, for example in the pre-rendering process, generating the range cube map from a spherical panorama range texture.

The method may comprise, for example in the pre-rendering process, generating an image cube map from a spherical panorama image texture. The image cube map may comprise an intensity texture image cube map. The image cube map may comprise a colour texture image cube map.

The method may comprise, for example in the pre-rendering process, generating first and second image cube maps. The first image cube map may be an intensity texture image cube map and the second cube map may be a colour texture image cube map.

Generating the, or each, image cube map may comprise generating or using a tile map. The tile map may comprise a plurality of tiles on each face of a cube. The tile map may comprise polygonal tiles, each tile having three or more vertices. The tiles may be the same shape. The tiles may be the same size. The tiles may be rectangles. A face may comprise n×m tiles, where n and m are positive integers. n may equal m, i.e. n=m. n may be at least 8, i.e. n≥8. n may be up to 64, i.e. n≤64, or more. n may equal 16, i.e. n=16. A rectangular tile may be defined using two diagonally-opposite vertices. Each tile may be divided into primitives. The primitives may be triangles. The method may comprise tessellating each tile and projecting tessellated points onto the face of a cube using corresponding range texels in the spherical panorama range texture.

Generating the, or each, image cube map may comprise providing a set of vertices arranged in tiles for a face of a cube and, for each face, tessellating each tile and projecting tessellated points onto the face of the cube using corresponding range texels in the spherical panorama range texture.

Generating the, or each, image cube map may further comprise culling at least one primitive (e.g. triangle). Culling primitives may comprise determining whether a primitive is orientated acutely to a scan origin and, in dependence on determining that the primitive is orientated acutely to the scan origin, culling the primitive. Determining whether a primitive is orientated acutely to a view point may comprise performing a normal test.

The method may comprise identifying one or more tiles ("dead tiles") corresponding to range values which do not meet a set of one or more conditions (for example, having a zero range and/or a exceeding a given threshold value) and storing the identity of the dead tile(s) for a face in a file.

Generating the, or each, image cube map may comprise dividing each primitive into primitive fragments (e.g. triangle fragments) and, for each primitive fragment, sampling a corresponding texel of the spherical panorama image texture.

The image cube map may be stored in memory, e.g. graphic memory and/or system memory and/or in storage.

The pre-rendering process may be carried out once and, thereafter, the spherical panorama range, image and/or colour textures need not be used during subsequent rendering.

The method may comprise, for each frame, rendering off-screen images corresponding to a plurality of scans at a relatively low resolution for a given view point and selecting which images to render on-screen at a relatively high resolution for the given view point.

Rendering may comprise generating or using a tile map. The tile map may comprise a plurality of tiles on each face of a cube. The tile map may comprise polygonal tiles, each tile having three or more vertices. The tiles may be the same shape. The tiles may be the same size. The tiles may be rectangles. A face may comprise n×m tiles, where n and m are positive integers. n may equal m, i.e. n=m. n may be at least 8, i.e. n≥8. n may be up to 64, i.e. n≤64, or more. n may equal 16, i.e. n=16. A rectangular tile may be defined using two diagonally-opposite vertices. Each tile may be divided into primitives. The primitives may be triangles. The method may comprise tessellating each tile and projecting tessellated points onto the face of a cube using corresponding range texels in the spherical panorama range texture.

Rendering may comprise providing a set of vertices arranged in tiles for a face of a cube. In dependence upon determining that a tile is a dead tile, the dead tile need not be tessellated. In other words, vertices for dead tiles may be culled. This can help to reduce use of GPU resources. Culling of vertices of dead tiles may be performed by a tessellation control shader (or shader having the same or similar function).

Rendering may comprise, for each face, tessellating each tile and projecting tessellated points onto the face of the cube using corresponding range texels in the range cube map.

Rendering may comprise culling primitives (e.g. triangles). Culling primitives may comprise determining whether a primitive is orientated acutely to a scan origin and, in dependence on determining that the primitive is orientated acutely to the scan origin, culling the primitive. Determining whether a primitive is orientated acutely to a view point may comprise performing a normal test.

Rendering the image may comprise sampling the intensity cube map. Rendering the image may comprise sampling the colour cube map.

The GPU(s) may be configured using OpenGL 4.3 (or later) or Microsoft® DirectX® 11 (or later) application programming interface (API).

The method may further comprise generating a set of pixels for the scan and performing a depth test.

The method may comprise colouring a pixel in dependence upon the normal of the pixel. The method may comprise colouring a pixel in dependence upon intensity and/or colour in a corresponding part of an image.

The method may comprise providing more than one set of laser scan data, each set of laser scan data corresponding to a respective scan. Each set of laser scan data is provided as a respective range cube map and at least one image cube map. The method may comprise combining rendered images from different scans. Combining rendered images from different scans may comprise using a depth buffer.

According to a third aspect of the present invention there is provided a computer program which comprises instructions for performing the method.

According to a fourth aspect of the present invention there is provided a computer readable medium or non-transitory computer-readable medium which stores the computer program.

According to a fifth aspect of the present invention there is provided computer system comprising memory and at least one processing unit. The at least one processing unit is (are) configured to generate a tessellation pattern by using a range cube map and to render an image based on the tessellation pattern by sampling the image cube map corresponding to the range cube map.

The at least one processing unit preferably comprise at least one graphical processing unit. The at least one processing unit may comprise one processing unit, for example, one graphical processing unit.

The at least one processing unit may be configurable using OpenGL 4.3 (or later) application programming interface. The at least one processing unit may be configurable using a Microsoft® DirectX® 11 (or later) application programming interface.

BRIEF DESCRIPTION OF THE DRAWINGS

Certain embodiments of the present invention will now be described, by way of example, with reference to the accompanying drawings, in which.

DETAILED DESCRIPTION OF THE CERTAIN EMBODIMENTS

System Overview

Figure 1:
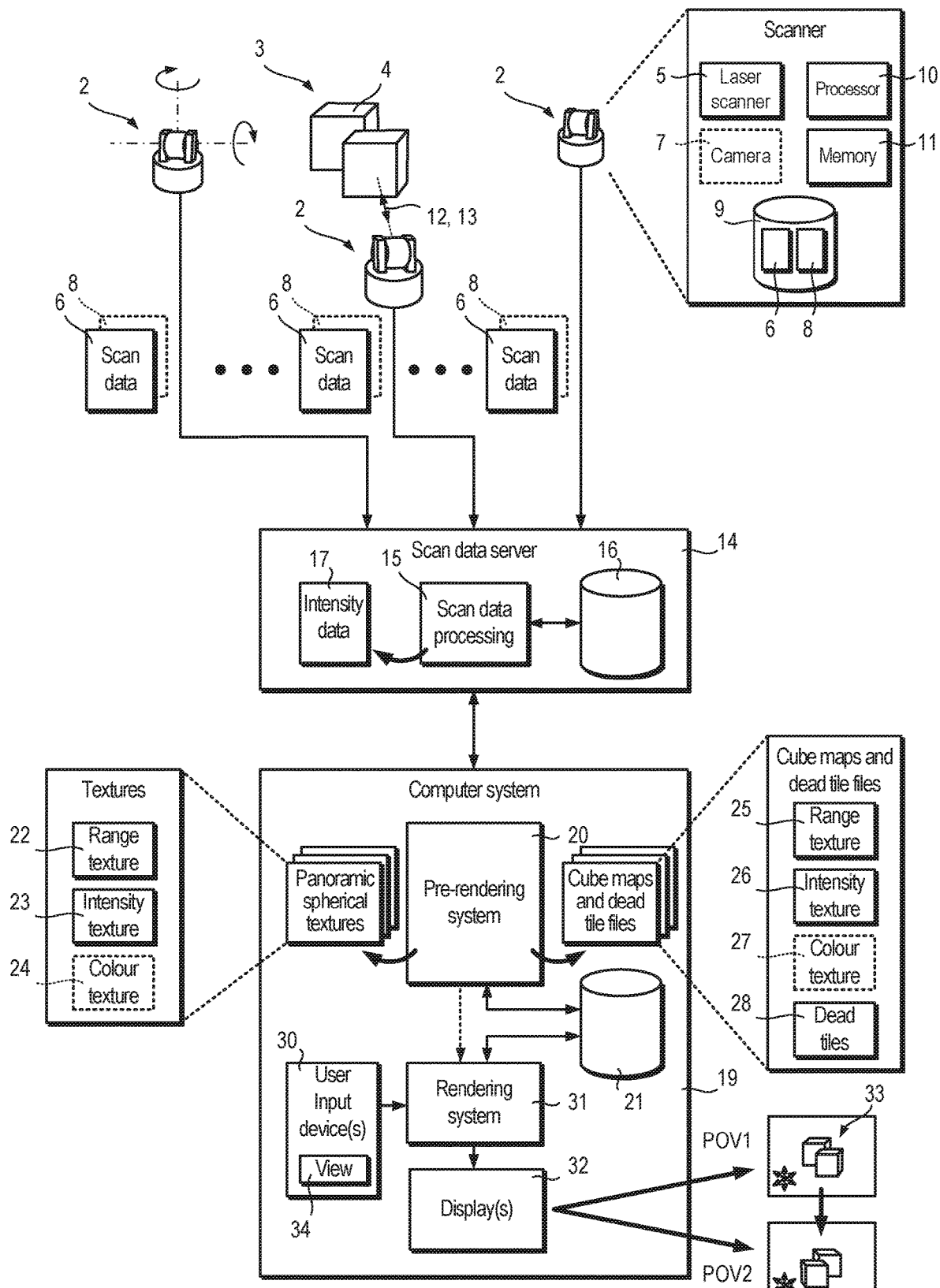
FIG. 1 is a schematic block diagram of a system for obtaining and processing laser scan data, and rendering an image.

Referring to FIG. 1, a system 1 for generating and processing laser scan data and for rendering an image is shown.

The system 1 includes one or more three-dimensional laser scanners 2 for surveying an environment 3 (or "scene") which includes a number of target surfaces 4. The, or each, laser scanner 2 includes a laser scanning unit 5 which generates raw laser scan data 6 (herein referred to simply as "laser scan data" or simply "scan data"), for example which contains range, intensity, azimuth and elevation for each pixel (and which may be stored in a compressed form), an optional colour camera 7 which can be used to generate colour image data 8, for example in the form a JPEG file, and on-board storage 9 for storing the data 6, 8. The laser scan data 6 can be converted into a ZFC file format. The, or each, laser scanner 2 includes processor(s) 10 and memory 11 which can be used to process the laser scan data 6, for example, to format the data and/or the image data 8.

The laser scanning unit 5 generates an element (which may be referred to as a "pixel") of scan data 6 for a point by emitting a pulsed laser beam 12 in a given direction (i.e. at given a horizontal angle and a given vertical angle), sensing the beam 13 that is reflected off a target surface 4, back to the laser scanner 2, and determining a range, R, to the target surface 4 based on time of flight of the laser beam 12, 13. A set of scan data 6 can be acquired by scanning the laser beam 12 in rapid up-and-over circular sweeps, i.e. a sweep lying in a vertical scan plane, while slowly turning, i.e. rotating the scan plane around a vertical axis, so as to build up a set of points around the scanner 2. Each point in the scan data 6 is provided in the form of a set of Cartesian coordinates, i.e. each point is expressed in (x, y, z). Points in a set of data 6 are ordered by azimuth and elevation.

The scan and image data 6, 8 are uploaded to a scan data server 14 (herein also referred to as a "gateway"). The scan data server 14 includes a scan data processing module 15 and storage 16. The scan data server 14 can pre-process scan data 6, for example, by extracting intensity data 17 from the scan data 6 for a monochromatic image.

The scan data 6, intensity data 17 and, optionally, image data 8 are downloaded to a computer system 19 for rendering. The computer system 19 includes a pre-rendering system 20 and storage 21 for carrying out one-off data pre-processing.

The pre-rendering system 20 converts the scan data 6, intensity data 17 and image data 8 into corresponding equipolar panoramic spherical textures 22, 23, 24 (herein also referred to as "panoramic spherical textures" or as "equirectangular textures"). Conversion may result in gaps or holes (not shown) in a texture 22, 23, 24 and so the pre-rendering system 20 can also carry out hole filing, for example, using interpolation.

The pre-rendering system 20 converts the panoramic spherical textures 22, 23, 24 for each scan into corresponding cube maps 25, 26, 27. The pre-rendering system 20 also generates dead tile files 28, i.e. a file for each face of each cube map that identifies those regions of a cube face which contains no useful range data. This may be particularly helpful for outdoor scans.

Mapping a panoramic spherical texture 22, 23, 24 onto faces of a cube can help to reduce the amount of data stored (e.g. by up to about a quarter) without any perceptible loss in view quality. Furthermore, faces of cube map 25, 26, 27 can be individually loaded, on demand, into a graphics system for rendering. Moreover, cube map faces can be managed more effectively in memory, for example, by discarding dead tiles (i.e. regions containing no useful range data).

The computer system 19 includes user input devices 30 (such as a mouse and/or keyboard), a rendering system 31 and a display 32 (or displays 32) for displaying an image 33 of a scene 3 from a point of view (POV) 34. The rendering system 31 produces triangulated three-dimensional surfaces using the textures 25, 26, 27 obtained from one or more different scans and renders the surfaces in real time, from any view point 34, combining surfaces obtained from the scan(s) in an image.

The pre-rendering system 20 and the rendering system 31 are implemented in the same computer system. However, the systems 20, 31 may be implemented in different computer systems.

Figure 2:
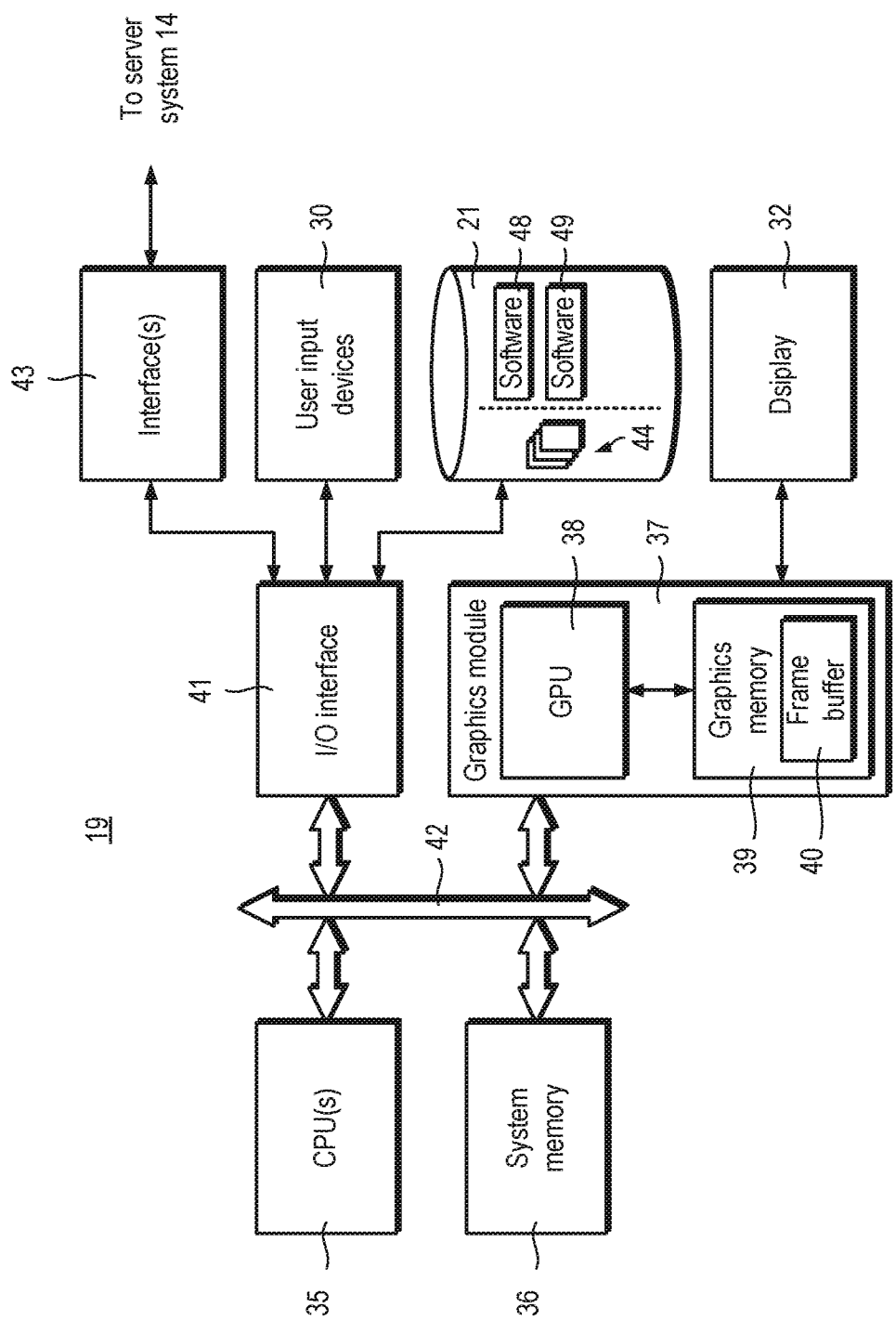
FIG. 2 is a schematic block diagram of a computer system which is used to process laser scan data and render an image.

Referring also to FIG. 2, the computer system 19 is shown in more detail.

The computer system 19 may take the form of a workstation, desk-top computer, lap-top computer or other sufficiently power computing device.

The computer system 19 includes one or more central processing units (CPUs) 35 having respective memory caches (not shown), system memory 36, a graphics module 37, for example in the form of a graphics card, which includes a graphics processing unit (GPU) 38 and graphics memory 39 (which may be referred to as "video RAM") which provides, among other things, a frame buffer 40, and an input/output (I/O) interface 41 operatively connected by a bus system 42. An example of a suitable graphics module 37 is an NVIDIA® GeForce 460 GPU with 1 GB of video RAM.

The I/O interface 41 is operatively connected to bus and/or network interface(s) 43 (such as Ethernet interface or WLAN interface) for receiving scan data 6, image data 8 and intensity data 17. The I/O interface 41 is also operatively connected to user input devices 30 and the storage 21, for example, in the form of one or more hard disk drives and/or solid-state drives. Some peripheral devices, such as removable storage, and other computer components are not shown. The computer system 19 may have a different configuration from that shown in FIG. 2.

As will be explained in more detail later, project data 44 is stored in storage 21. Project data 44 includes processed scan data for a sets of scans 45 (FIG. 13), each set including a name 46 (FIG. 13), a transform 47 (FIG. 13) and, for each cube face 63 (FIG. 13), a range texture 25, intensity texture 26, an optional colour texture 27 and dead tile file 28.

Conversion of scan and intensity data 6, 17 and optional image date 8 into corresponding panoramic spherical textures 22, 23, 24 is implemented in software run by the CPU(s) 35. Computer code 48 for implementing conversion is held in storage 21 and loaded into memory 36 for execution by the CPU(s) 35. Other pre-rendering processes, namely cube mapping and dead tile detection, are preferably implemented using the GPU 38.

Rendering is implemented using the GPU 38 so as to take advantage of the enhanced graphics processing capabilities of a GPU, in particular tessellation.

Application software 49 is used to access the project data 44 and interface with the graphics module 37.

Pre-Rendering Processing

Figure 3:
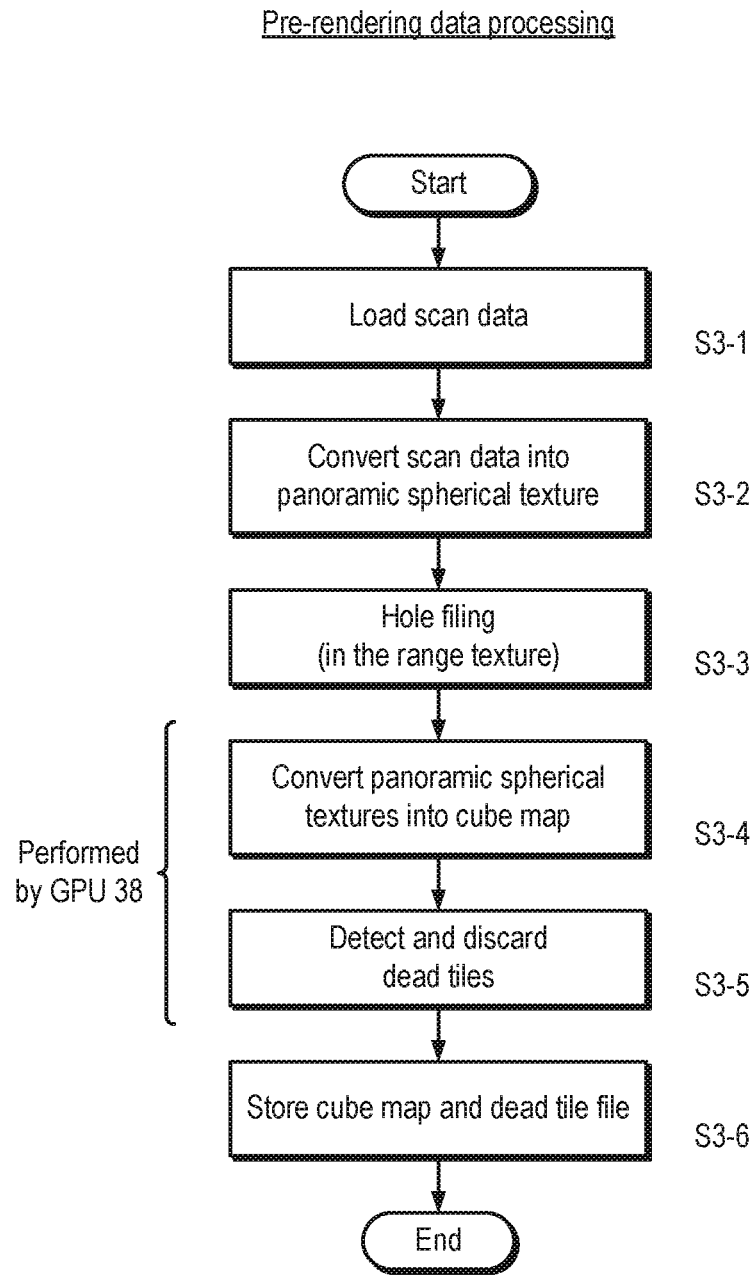
FIG. 3 is a process flow diagram of a pre-rendering process.

Referring to FIGS. 1, 2 and 3, operation of the pre-rendering system 20 will now be described in more detail.

Conversion of Scan Data into Panoramic Spherical Textures

The pre-rendering system 20 loads a set of scan data 6, intensity data 17 and, optionally, colour image data 8 for a scan from scan data server 14 via a communications network (not shown) (step S3-1).

The pre-rendering system 20 converts the scan data 6, intensity data 17 and, optionally, colour image data 8 into corresponding panoramic spherical textures 22, 23, 24 (step S3-2). Each panoramic texture 22, 23, 24 typically contains 10,000×5,000 pixels.

Mapping range data from scanner coordinates into panoramic spherical coordinates can lead to holes. Therefore, range values can be added using interpolated values so as to avoid discontinuities (step S3-3). Holes have a zero value so an image is scanned to look for holes and, using surrounding neighbours, to calculate a non-zero value to fill the hole.

Intensity values are copied and mapped into an intensity panoramic spherical texture 23 in the same way. Colour data 8, for example in the form of RGB component values, can be copied into a panoramic spherical colour map 27 in a similar way.

The panoramic spherical textures 22, 23, 24 are stored in storage 21 temporarily. As will be explained in more detail later, the panoramic spherical textures 22, 23, 24 are converted into corresponding cube maps 25, 26, 27 and, once this has occurred, the textures 22, 23, 24 can be discarded.

Conversion of Panoramic Spherical Textures into Cube Maps

The pre-rendering system 20 converts each panoramic spherical texture 22, 23, 24 into a corresponding cube map 25, 26, 27. Although cube mapping can be carried out by the CPU(s) 35, it can be performed more quickly by the GPU 38.

Figure 4:
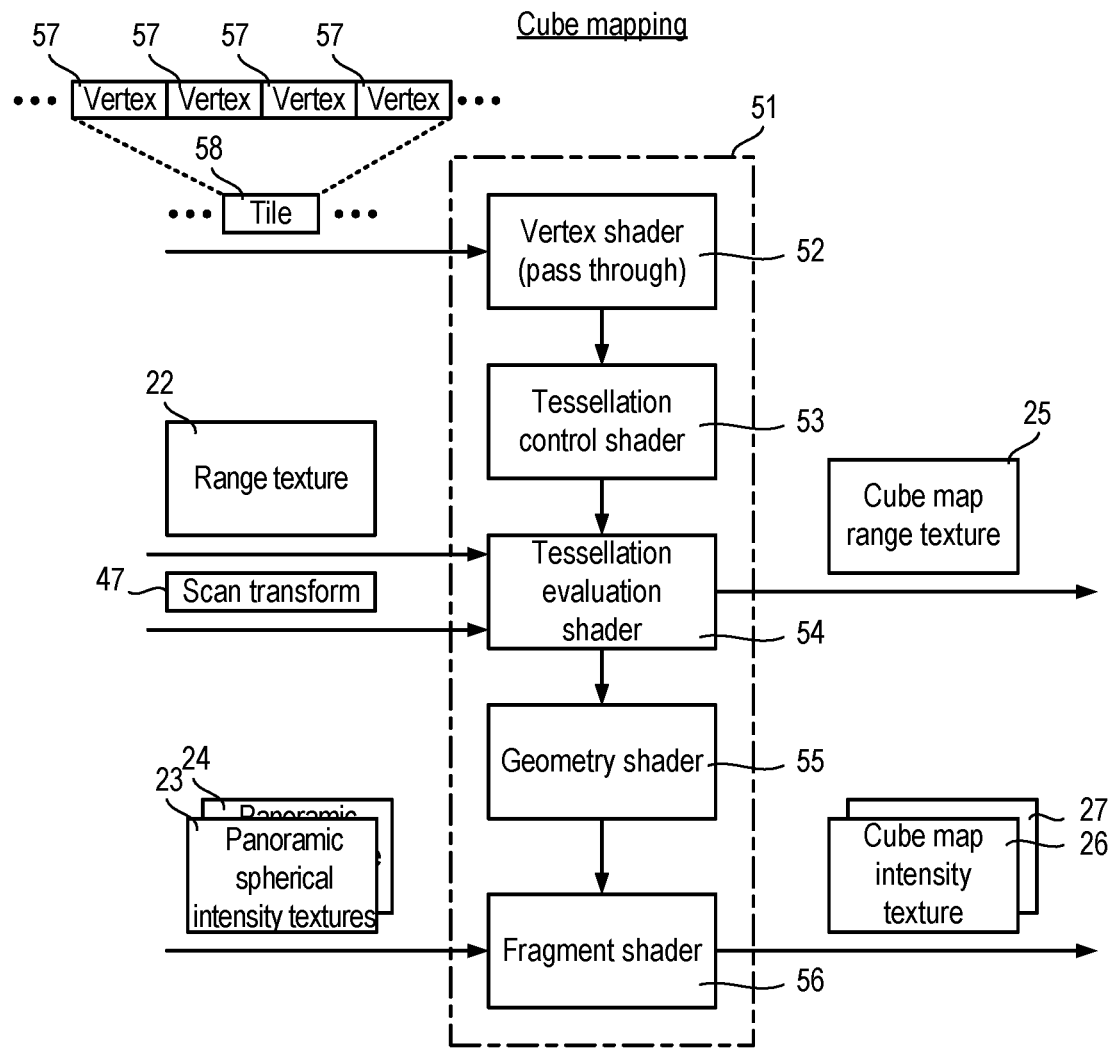
FIG. 4 is a schematic block diagram of a pipeline for mapping a panoramic spherical texture into a cube (herein referred to as "cube mapping")

Referring to FIG. 4, cube mapping is carried out using a pipeline 51 which is implemented by the GPU 38 (FIG. 2). The pipeline 41 includes a vertex shader 52, a tessellation control shader 53, a tessellation evaluation shader 54, a geometry shader 55 and a fragment shader 56. The tessellation control shader 53 may be referred to as a "hull shader", the tessellation evaluation shader 54 may be referred to as a "domain shader" and the fragment shader 56 may be referred to as a "pixel shader".

Figure 5:
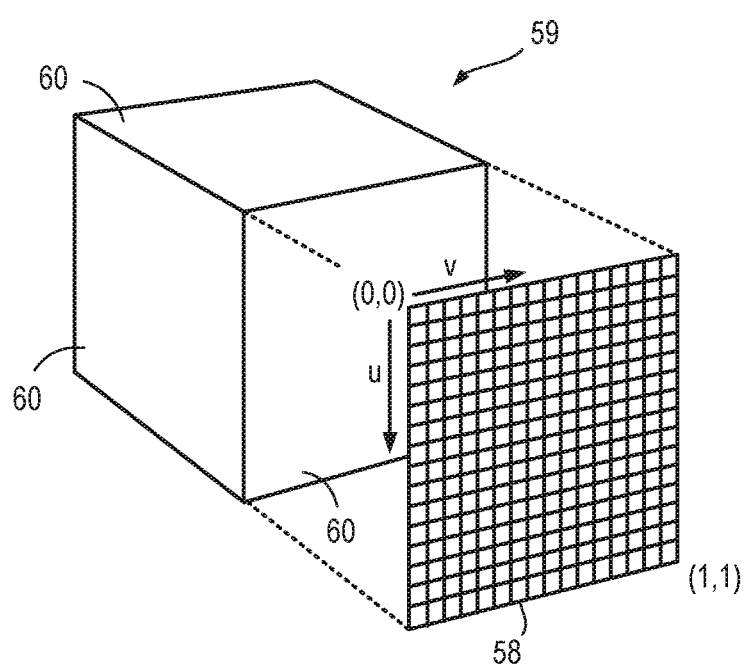
FIG. 5 illustrates a cube in which each face is divided into tiles.

Referring also to FIG. 5, the pipeline 51 processes vertices 57 (herein also referred to as "vertex data") which are arranged in tiles 58 for a cube 59 having six faces 60. The vertices 57 are expressed in (u,v) coordinates. Each face 60 is divided into tiles 58. In this case, each face is divided into 16×16 tiles 58.

Vertices 57 for each face 60 are fed, in tiles 58, to the vertex shader 52 which passes the vertices 57 through to the tessellation control shader 53. The tessellation control shader 53 outputs a tessellation level (not shown) for each tile 58 to the tessellation evaluation shader 54. In this case, a default tessellation value is used.

Figure 6:
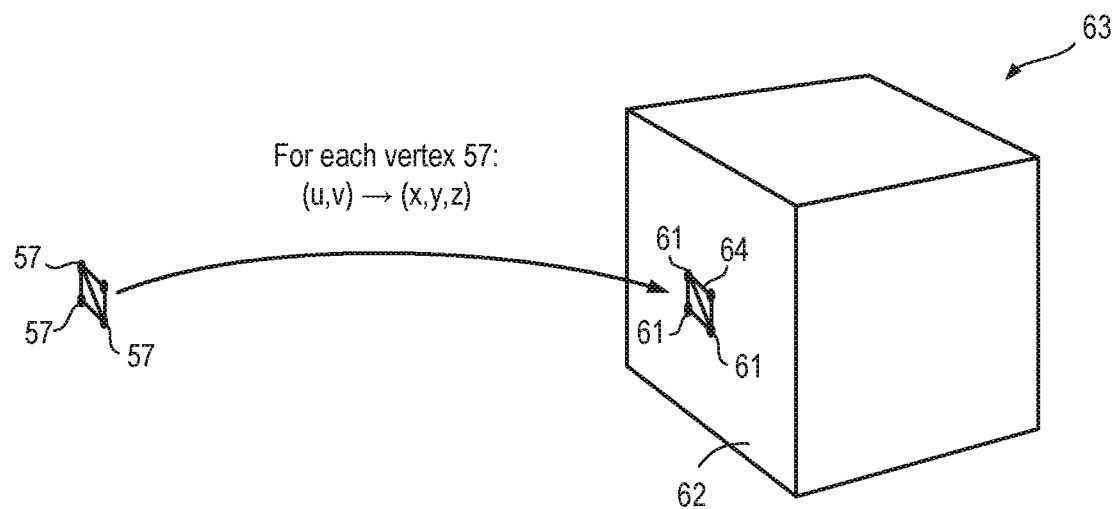
FIG. 6 shows projection of tessellated points onto a cube during cube mapping.

Referring also to FIG. 6, the tessellation evaluation shader 54 tessellates each tile 58 and projects tessellated points 61 onto a face 62 of a unit cube 63 in three-dimensional space. A tile 58 is described by virtue of a top left-hand corner and a bottom right-hand corner in Cartesian space. Once tessellated, each vertex 57 of each triangular facet 64, which is located on a unit cube, is projected by its corresponding range value using the range texture 22. The vertices 57 are then projected into the correct world position using the scan transform 47, for example, in the form of a 4×4 homogenous transformation matrix holding position and orientation.

The tessellated points 62 are passed to the geometry shader 55. The geometry shader 55 is responsible for culling triangles 64. Triangles 64 which are acute relative to the scan are dumped out. This is done using a surface normal test for each triangle 64. The resulting points 61 are passed to the fragment shader 56.

Figure 7:
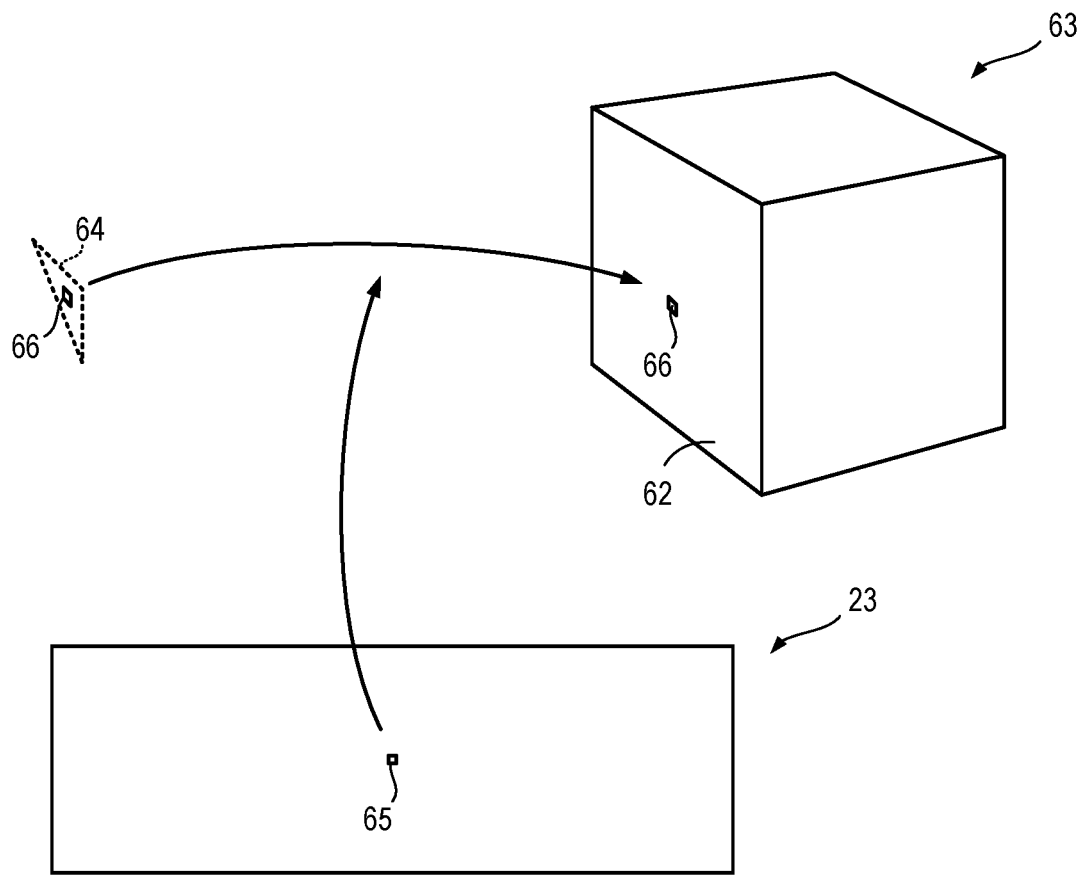
FIG. 7 shows sampling a panoramic spherical texture onto a face of a cube to generate a cube map.

Referring also to FIG. 7, the fragment shader 56 wallpapers the intensity and/or colour textures 23, 24 onto the correct triangles 64. The fragment shader 56 samples the intensity and/or colour textures 23, 24 and copies the value in a texel 65 in the texture 23, 24 into the value for a triangle fragment 66 (which may also be referred to as a "pixel") on the face 62 of the cube 63 thereby generating a new cube-based texture 23, 24, i.e. a cube map 23, 24. The cube map 25 can be shown laid out in a column. However, other cube layouts may be used. The fragment shader 56 also draws back faces, i.e. the outside outward-facing facing faces 73 (FIG. 12), in a blue shade that which can be seen in cube renderings.

The cube map(s) 23, 24 is stored, for example, in an off screen buffer 40.

Figure 8:
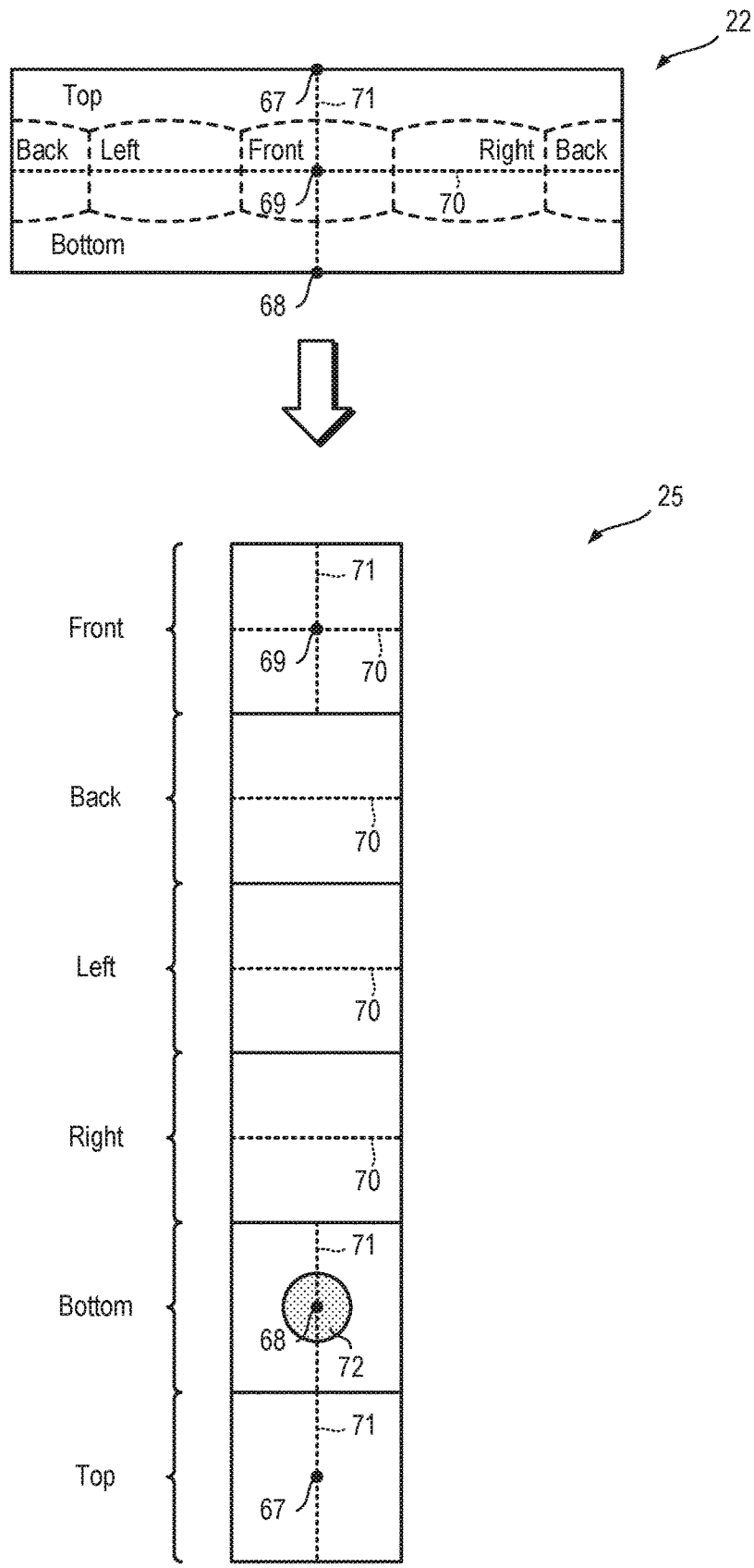
FIG. 8 schematically illustrates cube mapping.

FIG. 8 schematically illustrates transformation of a panoramic spherical texture 22, 23, 24 into a corresponding cube map 25 including poles 67, 68, a central point 69 lying on a horizon 70 between the poles 67, 68 and a meridian line 71 running through the central point 69. FIG. 8 shows a blind spot 72 around one of the poles 68.

Figure 9:
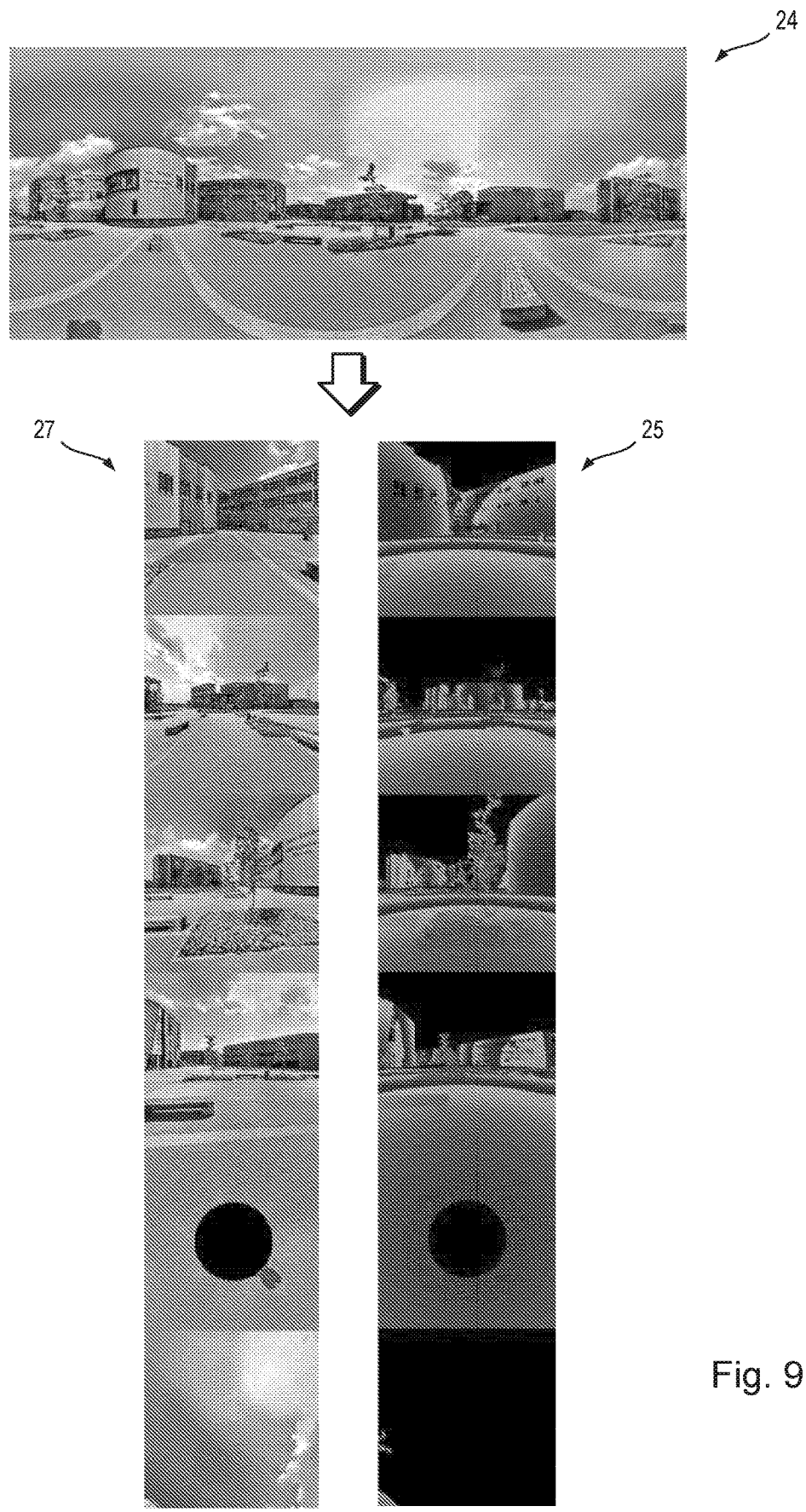
FIG. 9 illustrates cube mapping using real scan and image data.

FIG. 9 illustrate an image of a real colour panoramic spherical texture 22 and images of its corresponding laid-out range and colour cube maps 25, 27.

Detect Dead Tiles

Figure 10:
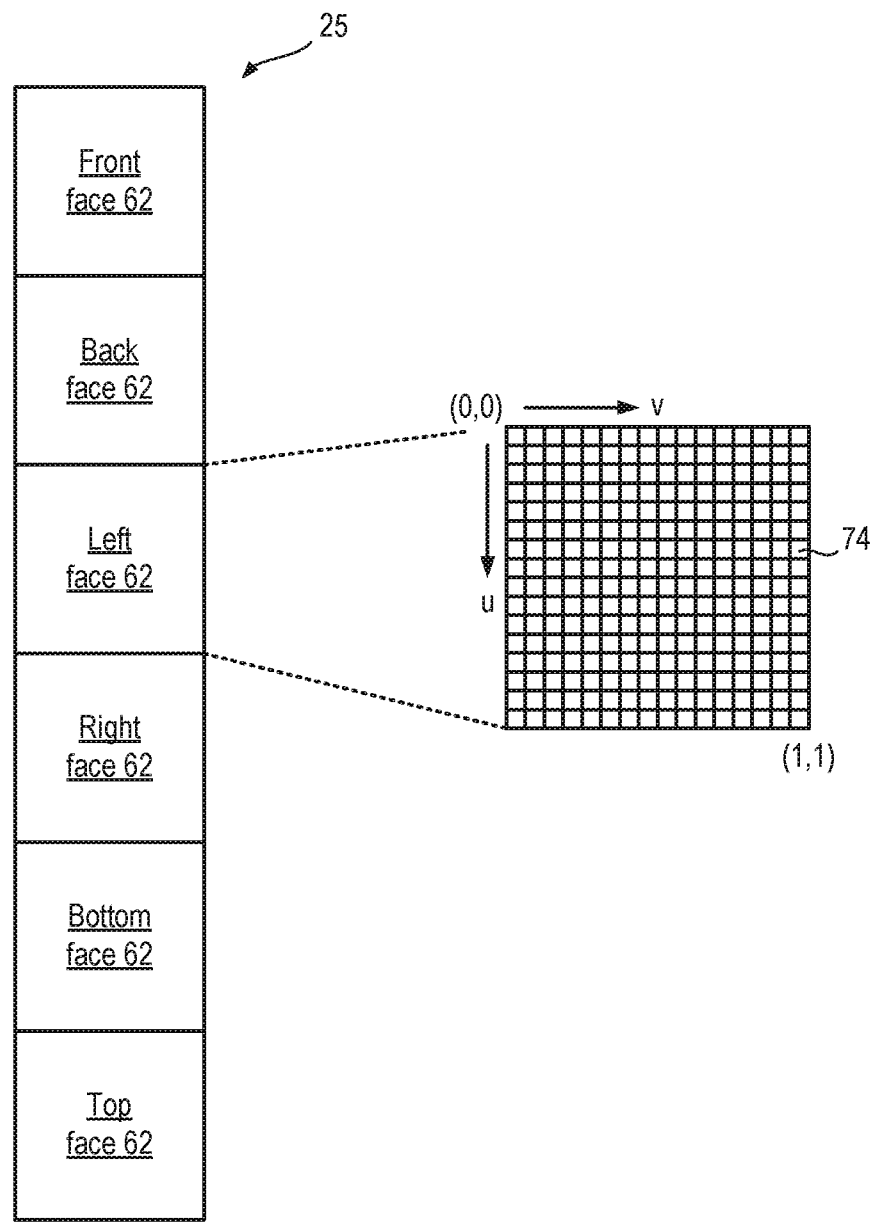
FIG. 10 show a cube map laid out.

Referring to FIG. 10, each face 62 on a cube map 25 is constructed from tiles 74. Some tiles 74 may contain no useful range data. For example, when a scan is performed outdoors, the scan may cover the sky. Thus, it is likely that all of the tiles 74 in the top face 62 of the cube map 25 contain no useful data. Furthermore, it is likely that upper tiles 74 in the front, back, left and right faces 62 also contain no useful range data.

Figure 11:
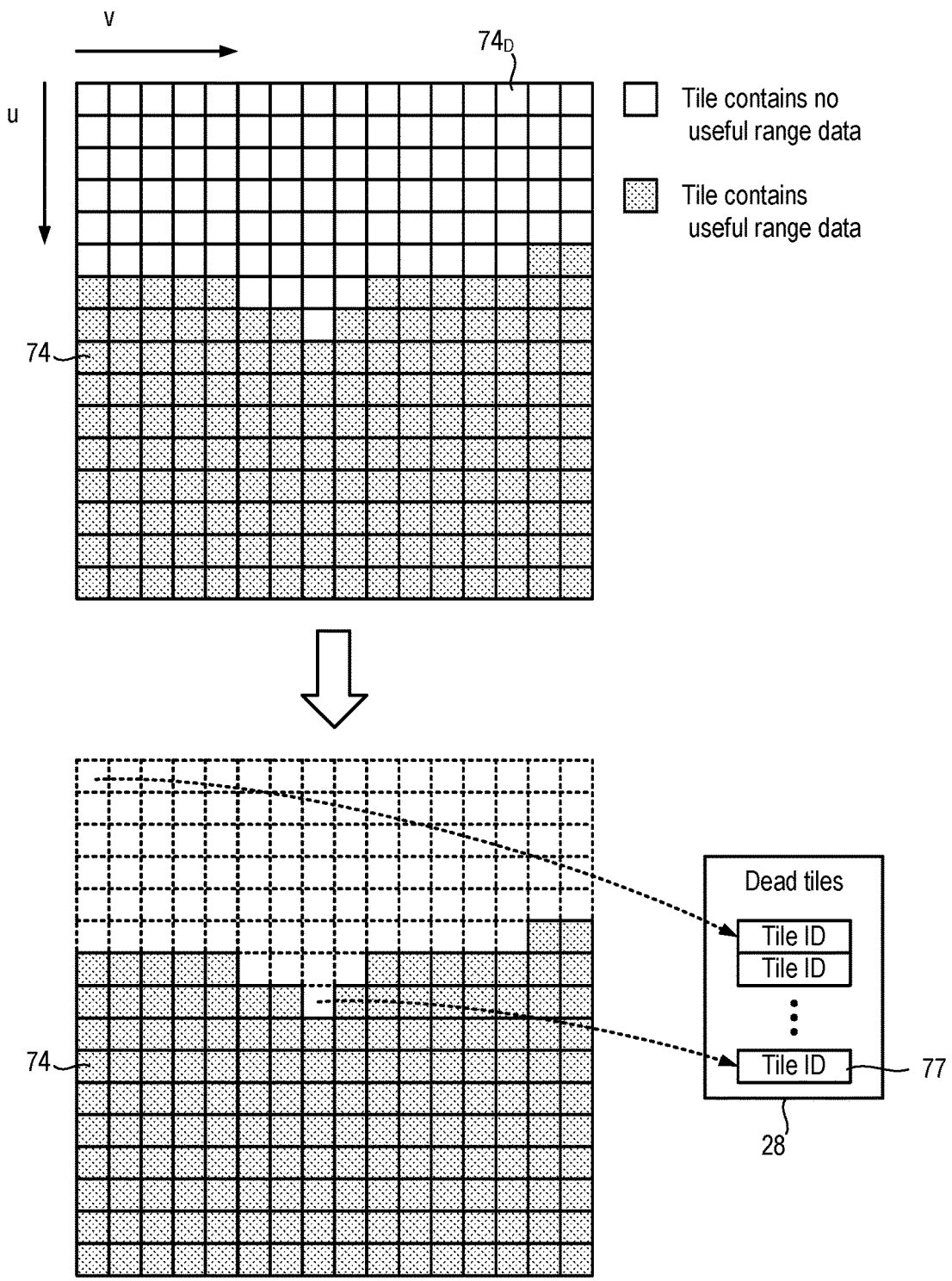
FIG. 11 schematically illustrates marking dead tiles.

Referring to FIG. 11, each tile 74D which contains no useful range data, for example where there is no range value or range value exceeds a given threshold value, is identified and a tile identifier 72 corresponding to the dead tile 74D is added to a list 28 of dead tiles 74D. The dead tile file 28 is stored in storage 21 (FIG. 2).

The dead tiles 74D are detected in the pre-rendering process. It is done once and the result is then stored. Dead tiles 74D are found in the geometry shader 55 (FIG. 4). Triangles 64 (FIG. 6) for a dead tile 74 typically is acute and so will be culled. Therefore, there will be no triangles 64 for that tile 74D and so it will be logged as dead.

As will be explained in more detail later, dead tiles 74D in corresponding image cube maps 26, 27 are not rendered. Not rendering dead titles 74D can speed up rendering of a scene.

Figure 12:
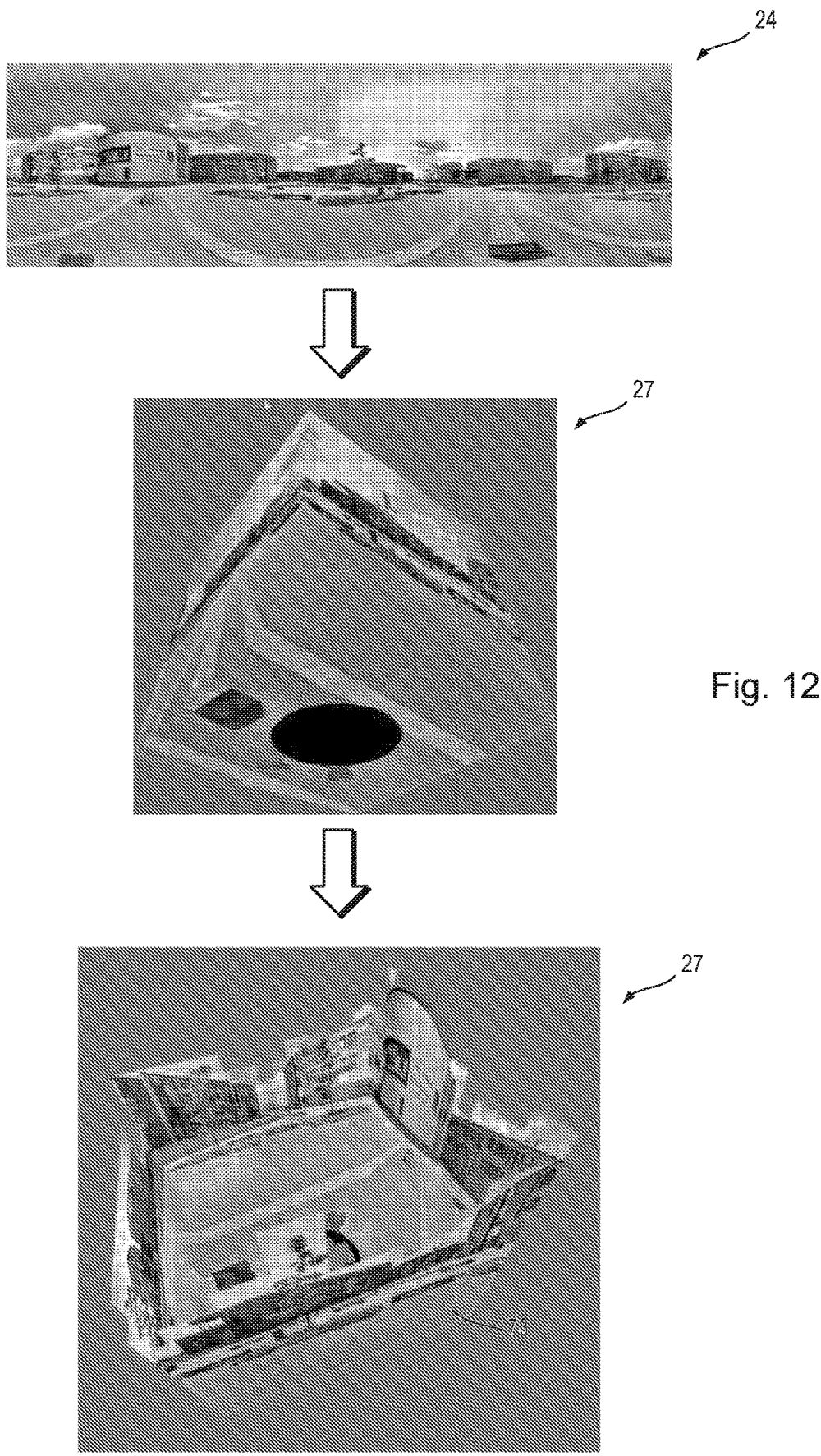
FIG. 12 illustrates a rendered image of a real colour panoramic spherical texture and rendered images of its corresponding colour cube map in three-dimensional image space with and without dead tiles.

FIG. 12 illustrates a rendered image of a real colour panoramic spherical texture 24 and rendered images of its corresponding colour cube map 27 in three-dimensional image space with and without dead tiles 74D.

Project Data

As hereinbefore described, pre-rendering data processing process need only be performed once for each scan. Once range textures 25, intensity textures 26, colour textures 27 and dead tile files 28 have been generated for a scan, the original scan data 6, intensity data 17 and, optionally colour image data 8, as well as the spherical panoramic textures 22, 23, 24, can be discarded.

The range textures 25, intensity textures 26 and optional colour textures 27 are generally stored having a full resolution. During rendering, the textures 25, 26, 27 can be sampled at full resolution, i.e. at a 1:1 ratio or sub-sampled at a ratio n:i, where n is a positive integer.

Figure 13:
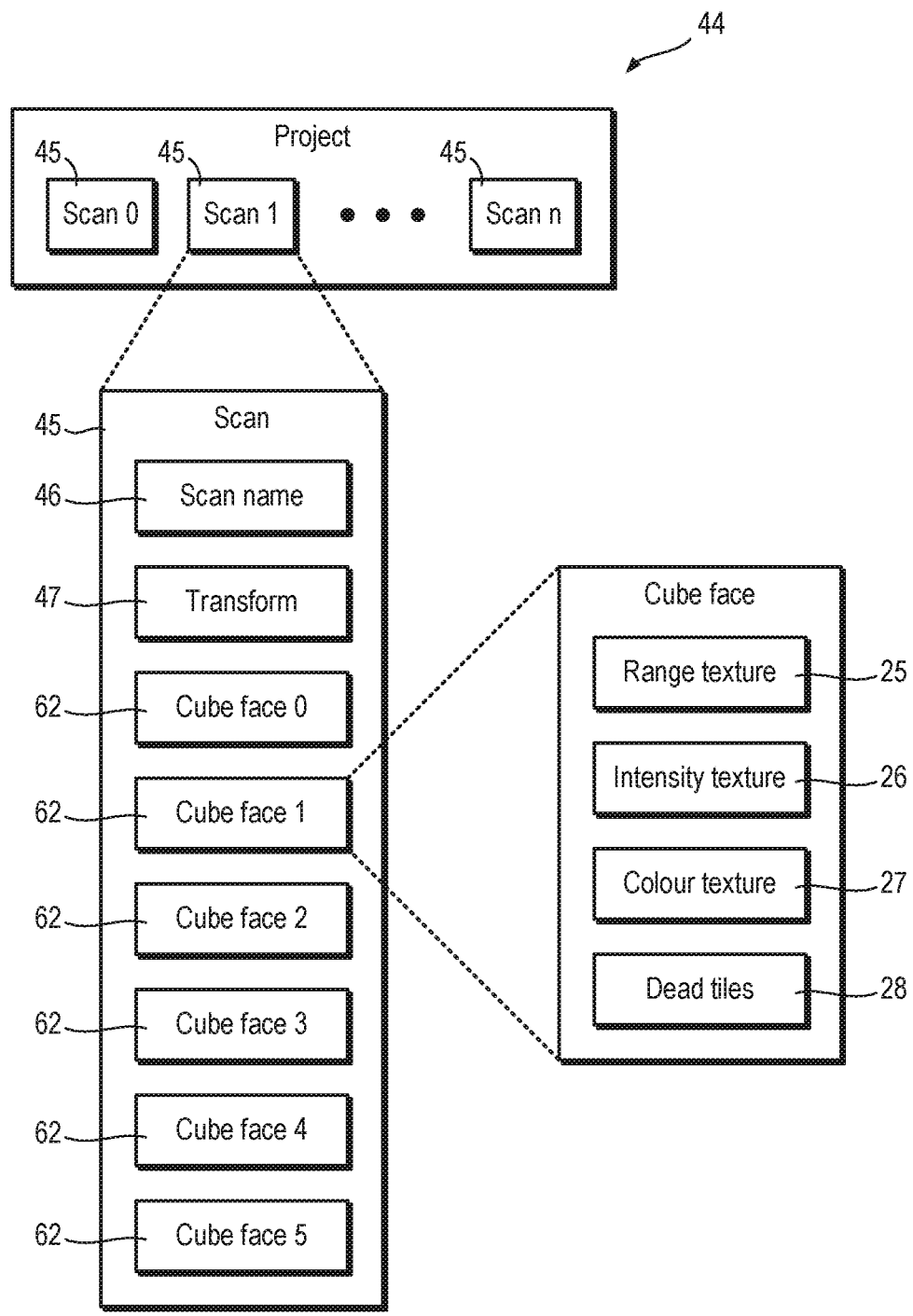
FIG. 13 is a schematic block diagram of project data.
Figure 14:
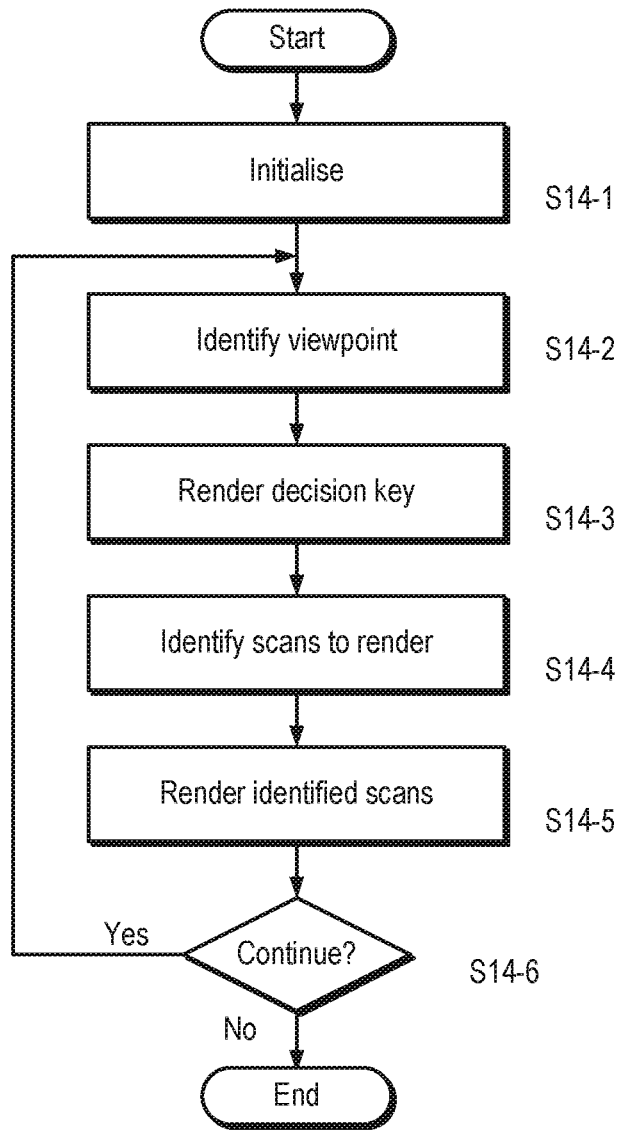
FIG. 14 is a process flow diagram of a rendering process.

FIG. 13 shows a project 44. A project 44 may store scan data 45 for a large number (e.g. 500 or more) of scans.

Referring to FIG. 13, each set of scan data 45 includes a scan name 46, a scan transform 46 and, for each cube face 62, a range texture 25, an intensity texture 26, an optional colour texture 27 and a dead tile file 28.

Rendering

Referring to FIGS. 1, 2, 13 and 14, a rendering process will now be described.

The rendering system 31 is initialised (step S14-1) and the system 31 identifies a view point 34, which can be controlled by a user via input devices 30 (step S14-2).

As explained earlier, a laser scan project may contain up to 500 scans or more. There may be too many scans for the graphics module 37 to handle. The rendering system 31 decides which scans to render for the view point 34 by rendering a decision key at the start of each frame (step S14-3) and identifying which scans to render (step S14-4). The selected scans are rendered (step S14-5) and the rendering process continues with the next frame (step S14-6).

Decision Key

The decision key involves rendering, off screen, all of the scans in the project at a very low resolution.

Each face has 16×16 tiles and the GPU 38 calculates an average range for each tile so that each face has 256 coarse range levels. Thus, each scan consists of 1,536 points (i.e. 6 faces×256 range levels). However, the number of points can differ, for example, due to a different number of tiles.

Figure 15:
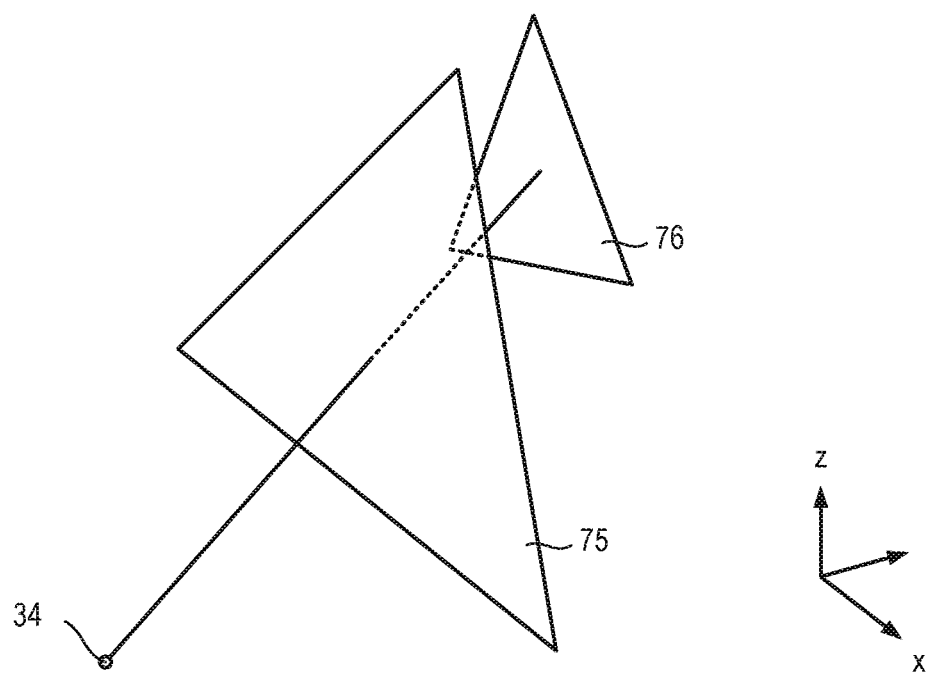
FIG. 15 illustrates first and second tessellated surfaces and a view point.

Referring to FIG. 15, first and second tessellated surfaces 75, 76 originating from first and second different scan are shown in three-dimensional image space. From view point 34, the first tessellated surface 75 is visible and exceeds a minimum size threshold. However, the second tessellated surface 75 may be obscured by the first surface and/or may be fall below the size threshold. This happens automatically in the zBuffer (not shown) after the shaders. The shaders do not have any cumulative visibility of an image and the decision key is performed in the zBuffer. The closest triangles will be drawn in the foreground.

Rendering

The rendering system 31 extracts, from storage 21, range textures 25, intensity textures 26, colour textures 27 and dead tile files 35 for the scans 45 identified in the decision key and passes the textures 25, 26, 27 and dead tile files 28 to the graphics module 37.

Figure 16:
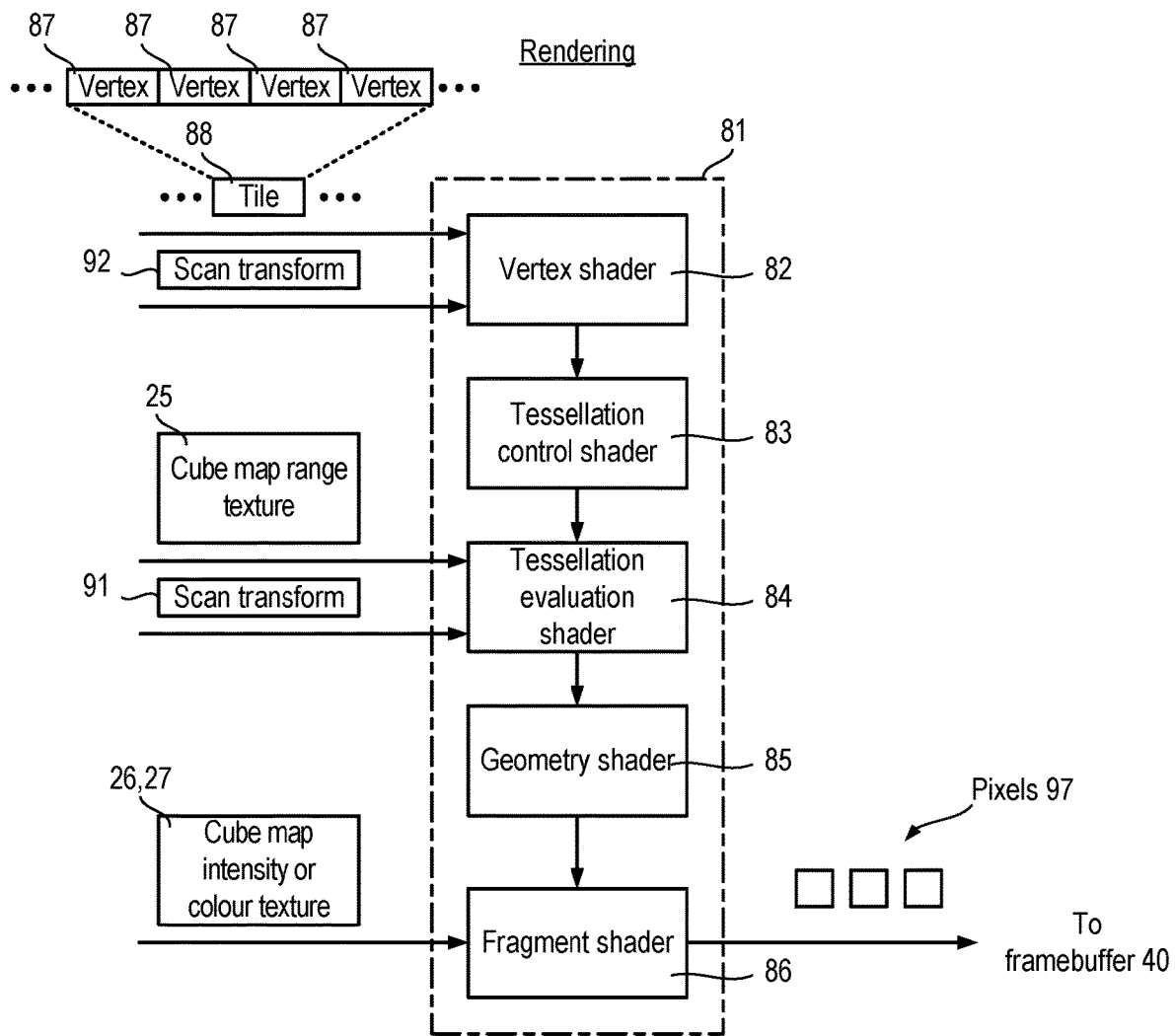
FIG. 16 a schematic block diagram of a pipeline of a rendering process.

Referring to FIG. 16, rendering is carried out using a pipeline 81 which is implemented by the GPU 38 (FIG. 2) and which includes a vertex shader 82, a tessellation control shader 83, a tessellation evaluation shader 84, a geometry shader 85 and a fragment shader 86. The shaders may be referred to using other names.

Figure 17:
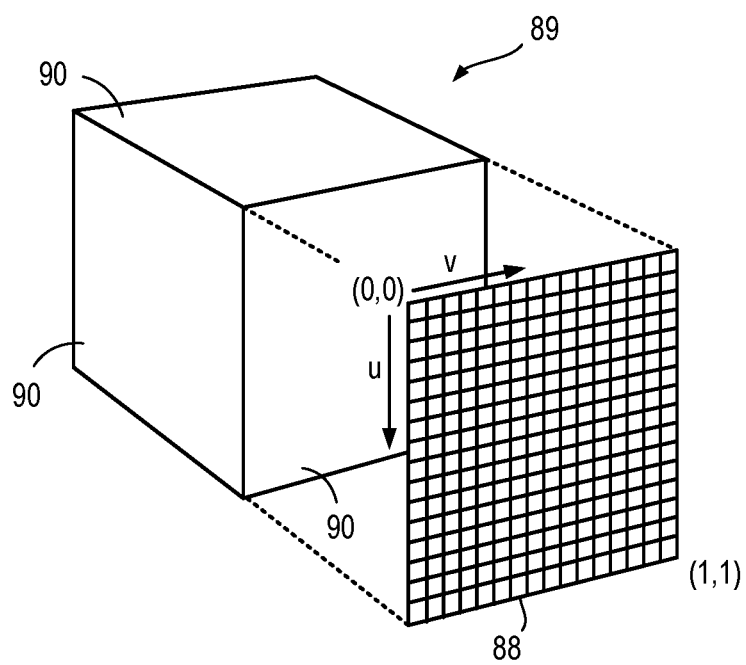
FIG. 17 illustrates a cube in which each face is divided into tiles.

Referring also to FIG. 17, the pipeline 81 processes vertices 87 which are arranged in tiles 88 for a cube 89 having six faces 90. The vertices 87 are expressed in (u,v) coordinates. Each face 90 is divided into tiles 88. In this case, each face is divided into 16×16 tiles.

Vertices 87 for each face 90 are fed, in tiles 88, to the vertex shader 82 which applies a scan transform 92 which is based on the user-defined view point 34. The vertex shader 82 outputs transformed vertex data 82 to the tessellation control shader 83. The tessellation control shader 83 outputs a tessellation level (not shown) for each tile 88 to the tessellation evaluation shader 54.

Vertices 87 for dead tiles are detected culled by the tessellation control shader 83 and are not passed on. Thus, this can help to reduce use of GPU resources and, thus, speed up rendering.

Figure 18:
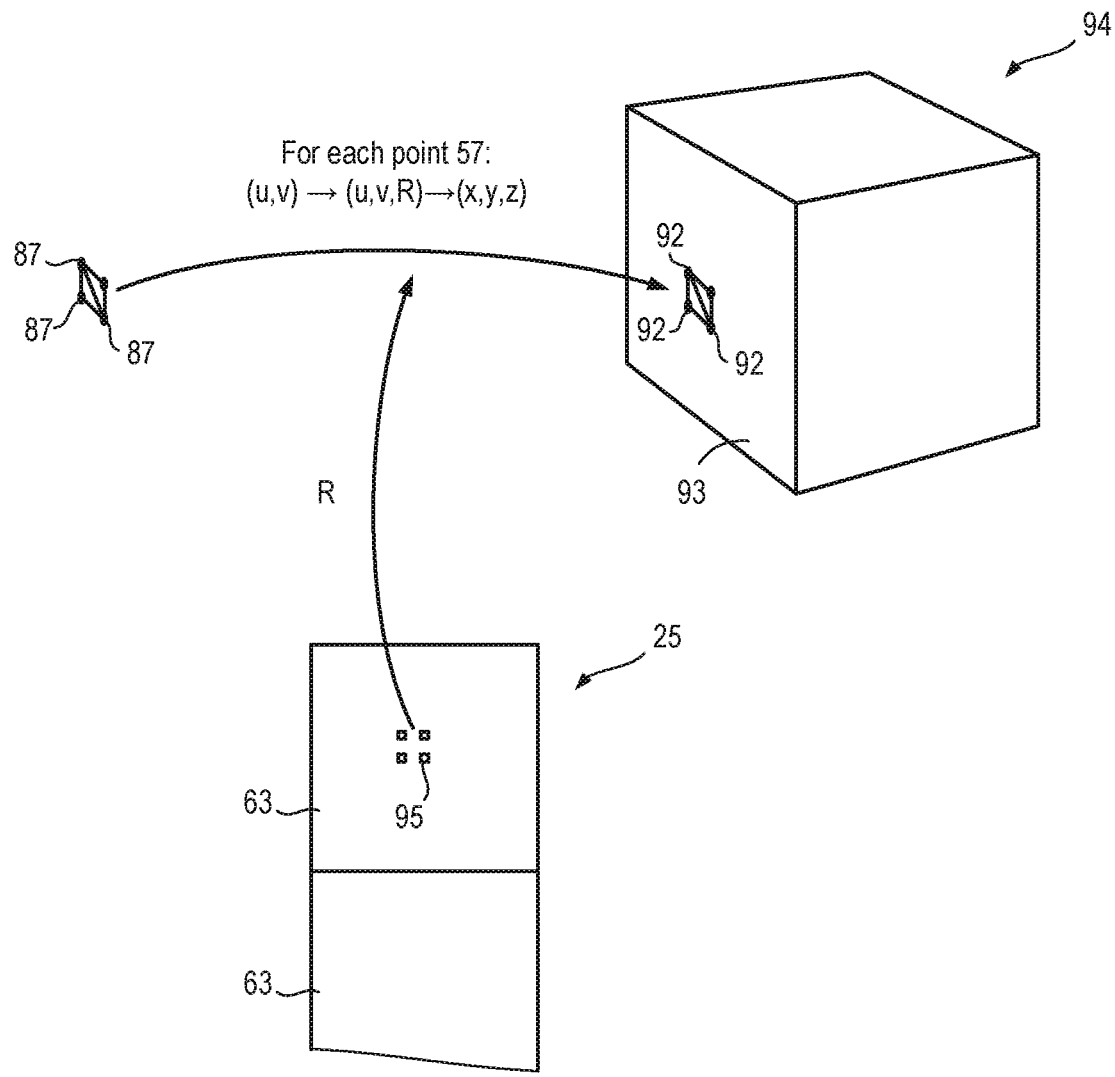
FIG. 18 shows projection of tessellated points onto a cube during rendering.

Referring also to FIG. 18, the tessellation evaluation shader 84 tessellates each tile 88 and projects tessellated points 92 onto a face 93 of a unit cube 94 in three-dimensional space displacing by a range, R, obtained by sampling range texels 95 in the range texture 25 at the (u, v) coordinates of the point 87.

The stream of tessellated points 92 is fed to the geometry shader 85 which culls triangles which lies at obtuse angles.

Figure 19:
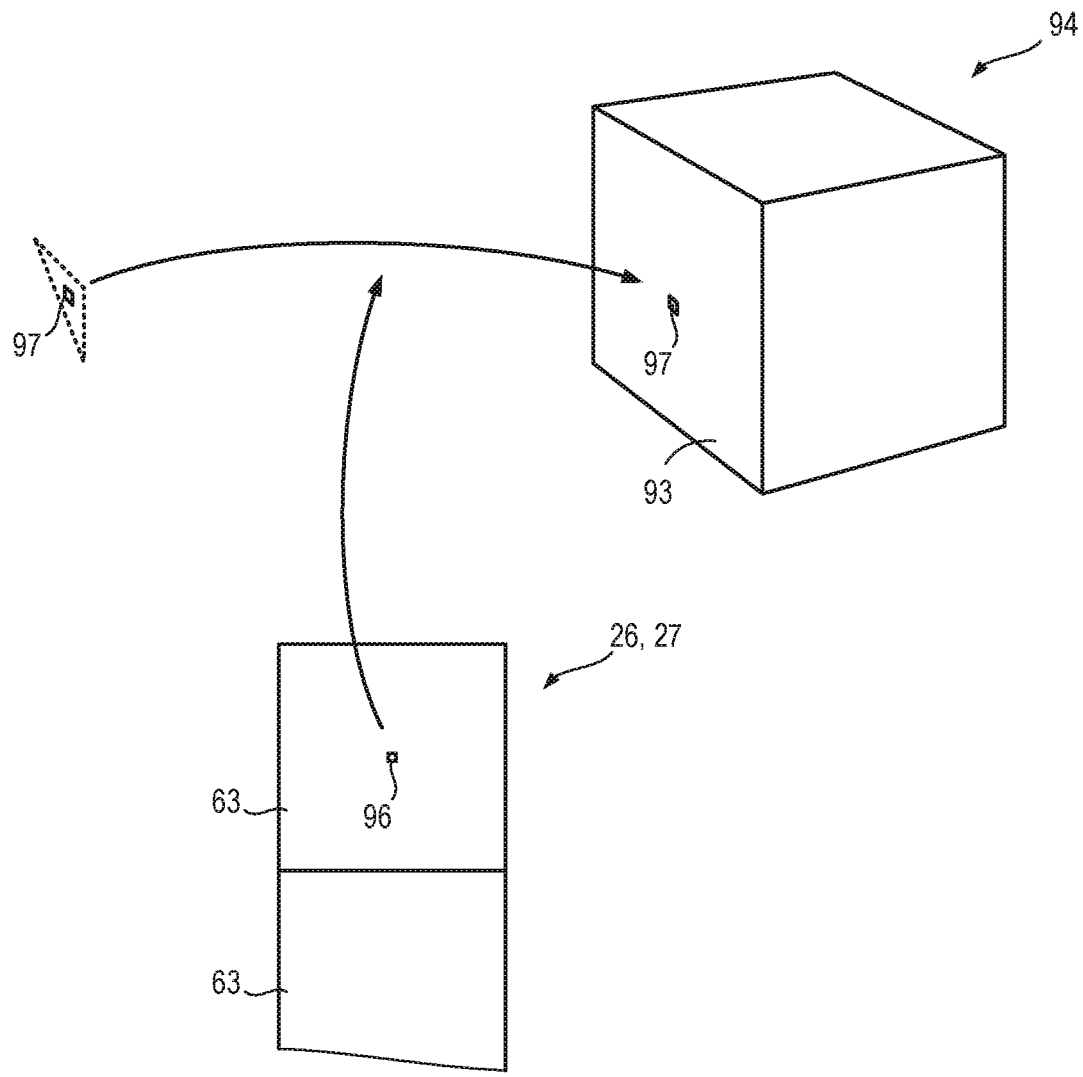
FIG. 19 illustrates shading/colouring fragments using a monochrome/colour cube map during rending.

Referring also to FIG. 19, depending on whether a monochrome or colour image is being rendered, the fragment shader 86 samples the intensity cube map 26 or colour cube map 27 and copies the value in a texel 96 in the cube map 26, 27 into the value for a triangle fragment 97 on the face 93 of the cube 94. Over the face 93 of the cube 94, this has the effect of projecting a monochrome or colour image onto the relief provided by the range texture.

The pixel data 97 are sent to the frame buffer 40. Pixel data 97 generated from several scans can be written to the same frame buffer 40 and, thus, an image comprising data from several scans can be formed.

Figure 20:
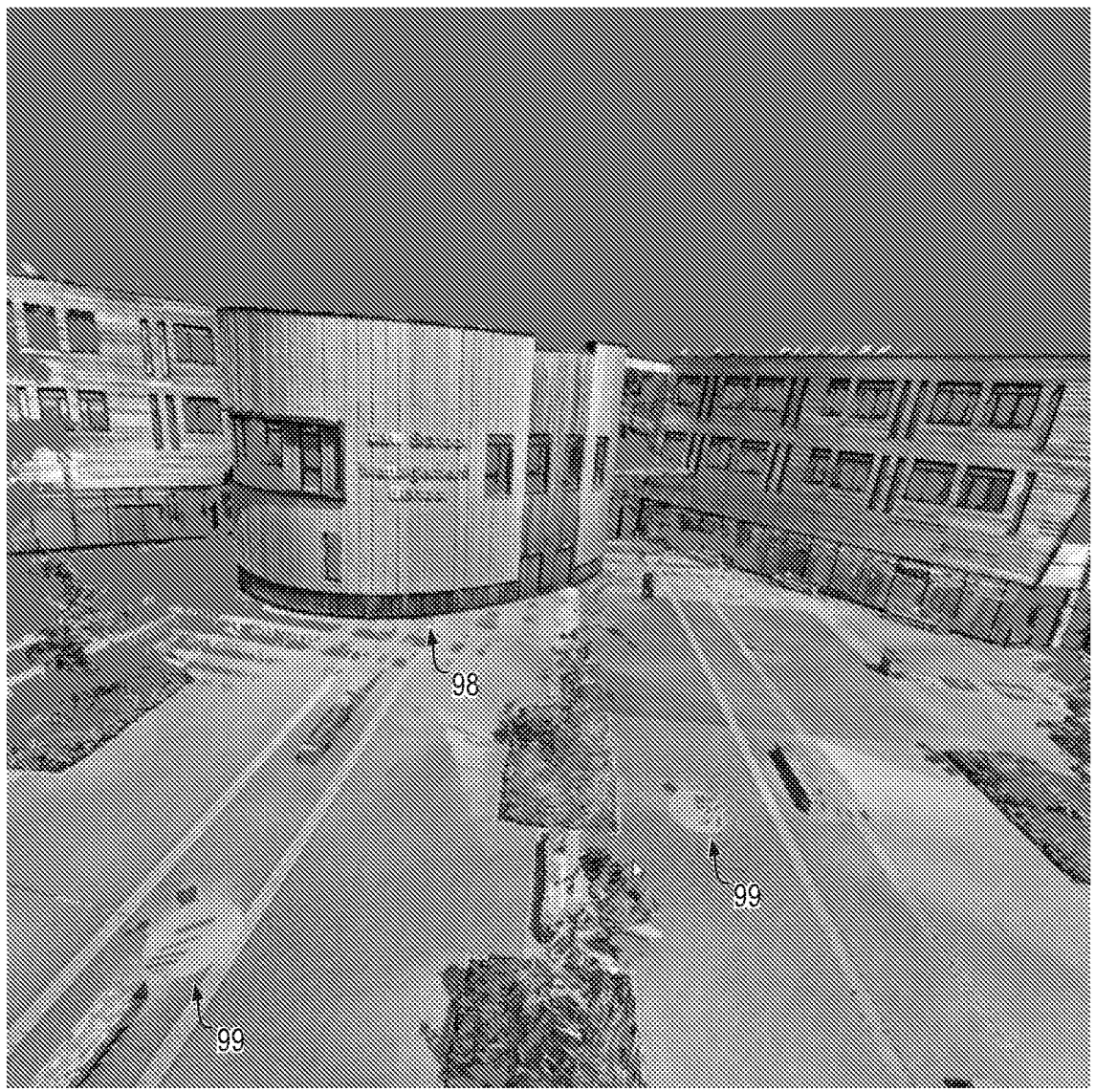
FIG. 20 is a first screen shot taken from a first view point during a fly through of a surveyed environment.
Figure 21:
FIG. 21 is a second screen shot taken from a second view point during a fly through of the surveyed environment shown in FIG. 20.

FIGS. 20 and 21 illustrate screen shots during a "fly through" a surveyed environment which includes a building 98 (marked "Law School Management School"). A colour panoramic spherical texture 25 for a scan and corresponding laid-out range and colour image cube maps 25, 27 are shown in FIG. 9. Corresponding colour image data is shown in FIG. 12. The scenes are formed from several scans and are rendered from different view points. A user can fly through the environment smoothly, in real time. The screen shots show "shadows" indicating position 99 of the scanner 2 (FIG. 1) when carrying out a scan.

It will be appreciated that various modifications may be made to the embodiments hereinbefore described. Such modifications may involve equivalent and other features which are already known in the design, manufacture and use of laser scan systems and/or graphics processing systems, and component parts thereof, and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of rendering an image of three-dimensional laser scan data, the method comprising:
   obtaining a range cube map comprising a range texture and an image cube map comprising at least one of an intensity texture and a color texture prepared from the three-dimensional laser scan data, wherein the image cube map corresponds to the range cube map;
   generating, by a graphics processing unit, a tessellation pattern using the range cube map;
   generating, by the graphics processing unit, the image cube map from a spherical panorama image texture by culling at least one primitive comprising a corresponding set of vertices; and
   rendering an image based on the tessellation pattern by sampling the image cube map.

2. The method according to claim 1, further comprising:
   a pre-rendering process comprising preparing the range cube map and the corresponding image cube map; and
   a rendering process comprising generating tessellation patterns using the range cube map and rendering the images using the image cube maps from the three-dimensional laser scan data.

3. The method according to claim 2, wherein the pre-rendering process is performable once to prepare the range cube map and the corresponding image cube map, and the rendering process is performable more than once.

4. The method according to claim 1, comprising:
   generating the range cube map from the spherical panorama range texture.

5. The method according to claim 1, wherein generating the image cube map comprises:
   providing a set of vertices arranged in tiles for a face of a cube; and
   for each face of the cube, tessellating each tile and projecting tessellated points onto the face of the cube using corresponding range texels in the spherical panorama range texture.

6. The method according to claim 1, wherein generating the image cube map comprises:
   identifying one or more tiles having range value(s) which do not meet a set of one or more conditions; and
   storing the identity of the one or more identified tiles for a face in a file.

7. The method according to claim 1, wherein generating the image cube map comprises:
   dividing each primitive of the at least one primitive into primitive fragments; and
   for each primitive fragment, sampling a corresponding texel in the spherical panorama image texture.

8. The method according to claim 1, further comprising, during rendering:
   for each frame, rendering off-screen images corresponding to a plurality of scans at a relatively low resolution for a given view point and selecting which images to render on-screen at a relatively high resolution for the given view point.

9. The method according to claim 1, wherein rendering the image comprises:
   at least one of generating a tile map and using the tile map.

10. The method according to claim 9, wherein rendering the image comprises:
    tessellating at least one tile in the tile map; and
    projecting tessellated points onto the face of the cube using corresponding range texels in the range cube map.

11. The method according to claim 9, wherein rendering the image further comprises:
    in response to a tile having range value(s) which do not meet a set of one or more conditions, not tessellating the tile.

12. A non-transitory computer readable medium, which stores a computer program which comprises instructions for performing the method according to claim 1.

13. A method of processing three-dimensional laser scan data, the method comprising:
    generating, by a graphics processing unit, a tessellation pattern using a range cube map, the range cube map being prepared using a range texture and an image cube map comprising at least one of an intensity texture and a color texture from the three-dimensional laser scan data, wherein the image cube map corresponds to the range cube map, and wherein the image cube map is generated from a spherical panorama image texture by culling at least one primitive comprising a corresponding set of vertices; and
    rendering an image based on the tessellation pattern by sampling the image cube map.

14. A computer system comprising:
memory;
at least one graphics processing unit;
wherein the at least one graphics processing unit is configured to generate a tessellation pattern using a range cube map and render an image based on the tessellation pattern by sampling an image cube map corresponding to the range cube map prepared from three-dimensional laser scan data, wherein the range cube map comprises a range texture and the image cube map comprises at least one of an intensity texture and a color texture, the image cube map is generated from a spherical panorama image texture by culling at least one primitive comprising a corresponding set of vertices.

15. The computer system according to claim 14, wherein the at least one graphics processing unit is configurable using an OpenGL application programming interface.

16. The computer system according to claim 14, wherein the at least one graphics processing unit is configurable using a Microsoft (RTM) DirectX (RTM) application programming interface.

* * * * *